(No Model.)

G. H. GARRETT, Dec'd.
W. C. RODMAN, Administrator.
TRAP FOR SANITARY PURPOSES.

No. 424,943. Patented Apr. 1, 1890.

Witnesses.
George Rough Maltby.
Conrad Henry Marks.

Inventor
Gilbert Henry Garrett.
per Francis M. Rogers
Attorney.

UNITED STATES PATENT OFFICE.

GILBERT HENRY GARRETT, OF NEWCASTLE-UPON-TYNE, ENGLAND; WALTER C. RODMAN ADMINISTRATOR OF SAID GILBERT HENRY GARRETT, DECEASED.

TRAP FOR SANITARY PURPOSES.

SPECIFICATION forming part of Letters Patent No. 424,943, dated April 1, 1890.

Application filed October 6, 1888. Serial No. 287,395. (No model.) Patented in England July 26, 1888, No. 10,801.

*To all whom it may concern:*

Be it known that I, GILBERT HENRY GARRETT, engineer, a subject of the Queen of Great Britain, residing at South Street, Newcastle-upon-Tyne, in that part of Great Britain called "England," have invented new and useful Improvements in Traps for Sanitary Purposes, (the same having been patented to me in Great Britain by Letters Patent No. 10,801, dated July 26, 1888,) of which the following is a specification.

My invention relates to improvements in traps for sanitary purposes. In the ordinary U-trap it often happens that the siphon action of the discharge-pipe, as well as or combined with the sudden rush of fluid, carries all the fluid out of the bend or so much of it as to destroy the seal and permit sewer or other deleterious gases to escape into the building connected by it to the sewer. The object of my invention is to prevent this by insuring that the bend is always filled with water.

The way in which I attain my object will be readily understood by reference to the accompanying drawings, in which—

Figure 1:
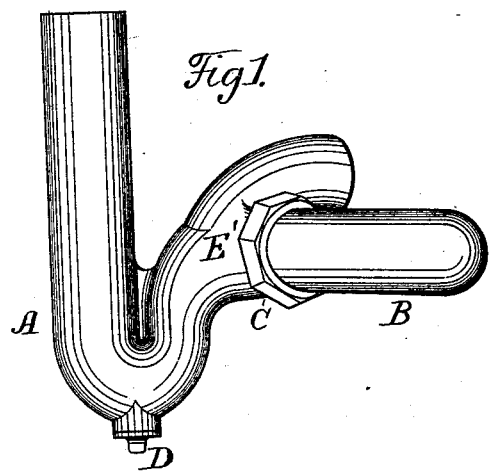
Figure 2:
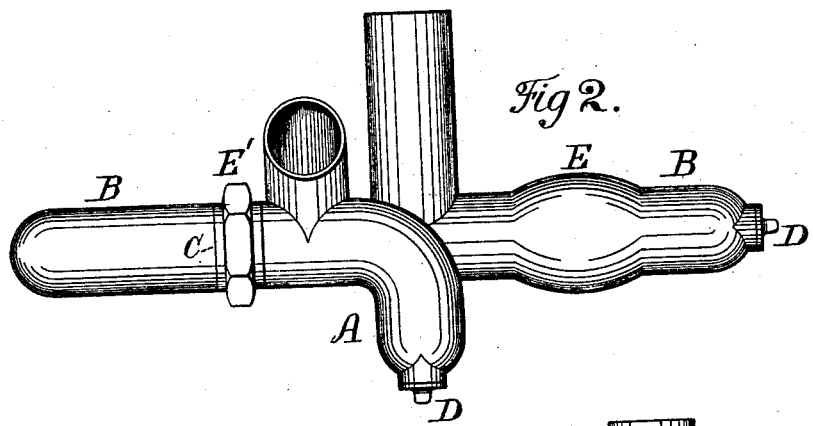
Figure 3:
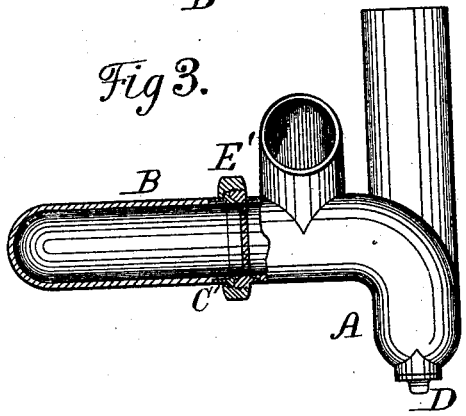

Figure 1 is a general perspective view of the trap; Fig. 2, a modification showing the double branch pipe; Fig. 3, an end view partly in section.

A, Fig. 1, shows one of the usual forms of a bend or siphon-trap. In a bend of this description I insert a branch pipe, chamber, or reservoir B, by preference, on the discharge side of trap. I so bend the discharge side of trap as to direct the flow of water into the branch pipe for the purpose of changing the fluid therein and making the pipe self-cleansing. The branch pipe, chamber, or reservoir B is open only at the end C, in connection with the trap, so that when fluid flows into the trap the branch pipe or reservoir B is filled with fluid whenever the fluid in the trap or bend is above the level.

The action of the trap thus arranged is as follows: When the sewer-pipe is flushed, the siphon action of the discharge-pipe to the sewer, together with the rush of fluid, will carry nearly all the fluid out of the bend A; but this action cannot draw the fluid out of the branch pipe, reservoir, or chamber B, as there will not be sufficient suction to overcome the partial vacuum formed at the closed end of pipe B. Immediately the fluid has reached the sewer through the sewer-pipe, the suction thereby set up in bend A will cease, and fluid will flow out from the open end of branch pipe C, so resealing the trap. When the flush-water or other fluid is passing through the trap, part of it will flow into the branch pipe, reservoir, or chamber B. The circulation thereby set up will change the contents and cleanse the chamber.

I sometimes insert a branch pipe, reservoir, or chamber B on opposite sides of the bend, as shown in Fig. 2, or branch pipes may be inserted on either side of receiving or discharge pipe of the trap.

The outer or closed end of branch pipe B may have a plug D, mounted upon it, for cleaning purposes, when it is solidly united by soldering or equivalent means, as at E, Fig. 2. When removably united to trap by a union-joint E' or equivalent means, the plug D can be dispensed with.

I am aware that prior to my invention sanitary traps have been constructed in which a bend is employed to effect the sealing of the pipe. To such bend by itself I lay no claim; but

I claim—

The combination, with a sanitary trap formed with a U-bend, of a horizontal reservoir-chamber mounted upon the discharge side of bend at a right angle thereto and having one opening only toward the same, said chamber being without partition, substantially as described.

In testimony whereof I have set my hand in presence of two witnesses.

GILBERT HENRY GARRETT.

Witnesses:
 T. D. FENWICK,
 A. B. GOLDSBROUGH.